United States Patent
Shaffer et al.

(10) Patent No.: US 11,671,474 B2
(45) Date of Patent: Jun. 6, 2023

(54) MULTIMEDIA CONFERENCING PLATFORM AND METHOD

(71) Applicant: FabZing Pty Ltd., Main Beach (AU)

(72) Inventors: Jon Frank Shaffer, Main Beach (AU); Gary Smith, Main Beach (AU)

(73) Assignee: FABZING PTY LTD., Main Beach (AU)

( * ) Notice: Subject to any disclaimer, the term of this patent is extended or adjusted under 35 U.S.C. 154(b) by 110 days.

(21) Appl. No.: 17/240,918

(22) Filed: Apr. 26, 2021

(65) Prior Publication Data

US 2021/0337004 A1 Oct. 28, 2021

Related U.S. Application Data

(60) Provisional application No. 63/015,990, filed on Apr. 27, 2020.

(51) Int. Cl.
*H04L 65/75* (2022.01)
*H04L 65/1073* (2022.01)
*H04L 65/401* (2022.01)
*H04L 65/403* (2022.01)
*G09B 5/06* (2006.01)
*G06N 3/08* (2023.01)
*G06F 21/32* (2013.01)
*G06F 21/64* (2013.01)
*G06N 20/00* (2019.01)

(52) U.S. Cl.
CPC .............. *H04L 65/75* (2022.05); *G06F 21/32* (2013.01); *G06F 21/64* (2013.01); *G06N 3/08* (2013.01); *G06N 20/00* (2019.01); *G09B 5/067* (2013.01); *H04L 65/1073* (2013.01); *H04L 65/403* (2013.01); *H04L 65/4015* (2013.01)

(58) Field of Classification Search
CPC . H04L 65/75; H04L 65/1073; H04L 65/4015; H04L 65/403; G06F 21/32; G06F 21/64; G06N 3/08; G06N 20/00; G09B 5/067; G09B 5/06
See application file for complete search history.

(56) References Cited

U.S. PATENT DOCUMENTS 7,340,759 B1 * 3/2008 Rodriguez ....... H04N 21/47202
  348/E5.002
10,540,418 B2 * 1/2020 Wellen ........... H04N 21/234345
(Continued)

*Primary Examiner* — El Hadji M Sall
(74) *Attorney, Agent, or Firm* — Smith Gambrell & Russell LLP

(57) ABSTRACT

A multi-media video conferencing platform and method which includes a user database configured to store usernames and details; a processor configured route multiple media streams to a user location; and a compiler configured to present a multimedia template at a client workstation, the template having a plurality of tiles, where each tile corresponds to a different media type, and the compiler is configured to identify a media type of an incoming media stream or media presentation. The processor routes the incoming media to a tile having a matching media type so that the media stream or presentation displays in the tile corresponding to its media type. The template presented by the compiler has tiles corresponding to at least incoming streaming video, incoming still media, and two-way interactive video.

15 Claims, 3 Drawing Sheets

(56) References Cited

U.S. PATENT DOCUMENTS

| | | | | |
|---|---|---|---|---|
| 2002/0064149 A1* | 5/2002 | Elliott | .................. | H04L 12/1403 |
| | | | | 370/352 |
| 2004/0133907 A1* | 7/2004 | Rodriguez | ........... | H04N 21/262 |
| | | | | 348/E7.071 |
| 2007/0220577 A1* | 9/2007 | Kongalath | .............. | H04L 65/80 |
| | | | | 348/E7.071 |
| 2014/0369621 A1* | 12/2014 | Diggins | ................. | H04N 19/14 |
| | | | | 382/251 |
| 2019/0364302 A1* | 11/2019 | Perlman | ............... | H04N 19/436 |

* cited by examiner

MULTIMEDIA CONFERENCING PLATFORM AND METHOD

FIELD OF THE INVENTION

The present disclosure relates to a multimedia conferencing platform that allows for integration of various media, URLs, and documents in real-time at higher resolution between two or more remote participants.

BACKGROUND OF THE INVENTION

There has been a huge migration to video conferencing platforms for remote learning. However, these platforms such as Zoom (10 million users in December 2019 to over 300 million users in April 2020) do not typically have the ability to include interactive documents for testing. Messaging companies such as Messenger, WeChat, and WhatsApp allow sharing of media, but in a separated format whereby recipients of video and imagery view such media in a delayed format of their own time and choosing. They lack voice, video, and imagery except in the sense of a short time lapse between sending and delayed viewing by the recipient. This delay in viewing and or reading can range in length from a few seconds to minutes or longer depending on a number of variables that the sender is not aware of or cannot see. Video conferencing is a different form of communication with inherent shortcomings. The vicarious joy of seeing and hearing a recipient laugh or smile is lost or dramatically diminished when they receive a LOL text instead of seeing the person laugh. The present disclosure describes a system and method replicating the interactivity and benefits in real time of in-person communication in referencing other media such as video and documents, even though participants are based remotely.

While messaging has more immediacy than email, it still does not meet a threshold of making participants feel as though they are in the same room together. Research reveals that working at home is more efficient and cost effective.

Screen sharing within video conferencing software offers poor resolution of whatever is being shared. Any other types of media sharing are cumbersome to attach (opening in a different window outside of the teleconference) and lack a mutual visual confirmation in real time. They then also lack interactivity.

SUMMARY

The present disclosure in one preferred aspect provides for a multimedia platform capable of presenting multiple media types concurrently. The platform may be configured depending upon the intended use. For example, in a legal setting, the platform can be configured to provide a one-way video, document, and video conference call simultaneously so that all participants receive the same presentation. In an academic setting, the platform may be configured to provide a one-way video, document(s) and video conferencing, but further include security enhancements tailored to the media type being presented (e.g., DocuSign verification for documents, or facial recognition to verify participant identity during an academic testing situation).

It is to be understood that both the foregoing general description and the following detailed description are exemplary and explanatory only and are not restrictive of the invention, as claimed. In the present specification and claims, the word "comprising" and its derivatives including "comprises" and "comprise" include each of the stated integers but does not exclude the inclusion of one or more further integers.

It will be appreciated that reference herein to "preferred" or "preferably" is intended as exemplary only. The claims as filed and attached with this specification are hereby incorporated by reference into the text of the present description.

The accompanying drawings, which are incorporated in and constitute a part of this specification, illustrate several embodiments of the invention and together with the description, serve to explain the principles of the invention.

DETAILED DESCRIPTION OF THE DRAWINGS

Reference will now be made in detail to the present preferred embodiments of the invention, examples of which are illustrated in the accompanying drawings.

Figure 1:
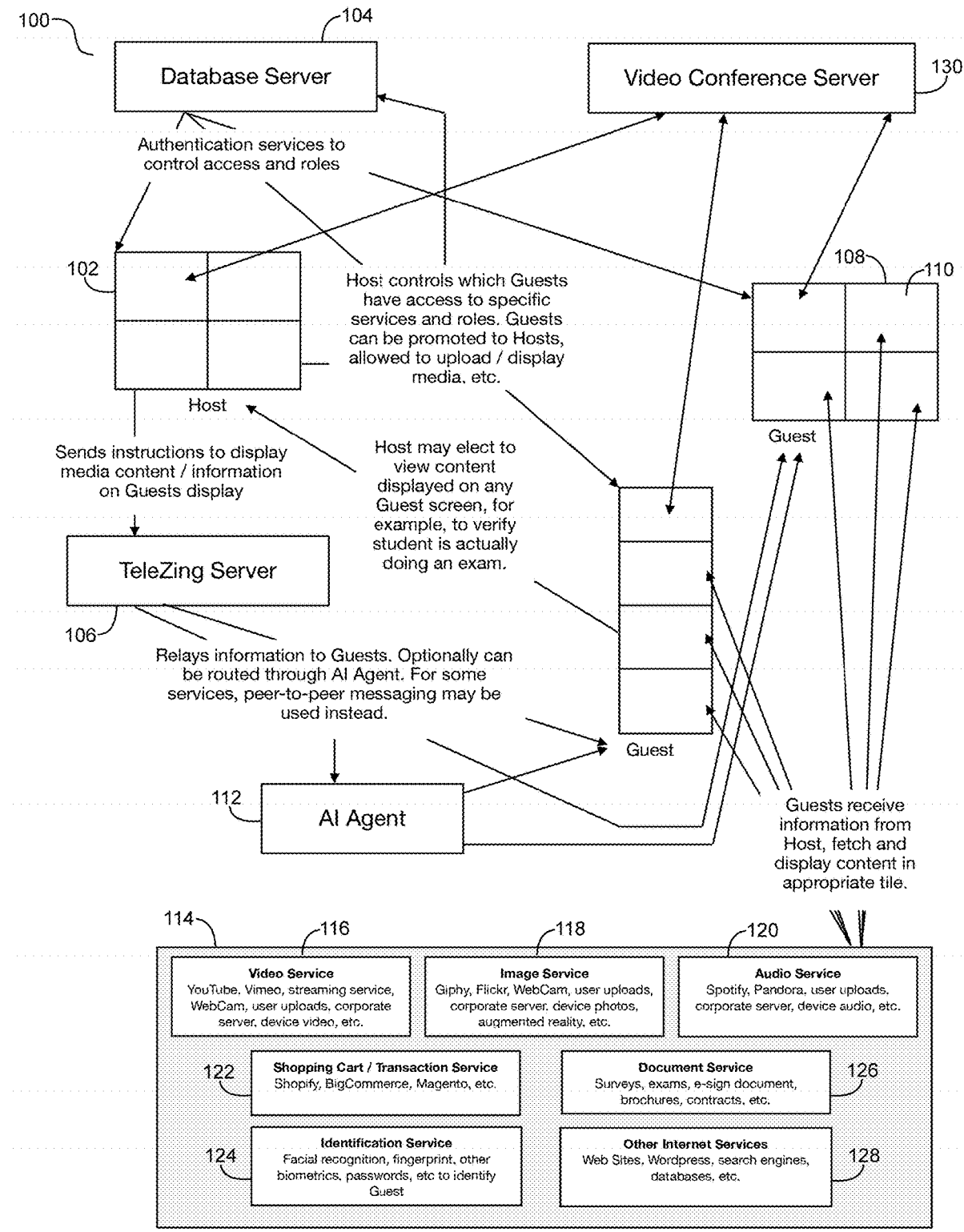
FIG. 1 is a system diagram of main system components in accordance with a preferred embodiment of the disclosure.
Figure 2:
FIG. 2 is a screenshot of a video conference template with four tiles, each with a different media type in accordance with a preferred embodiment of the present disclosure.
Figures 3, 4:
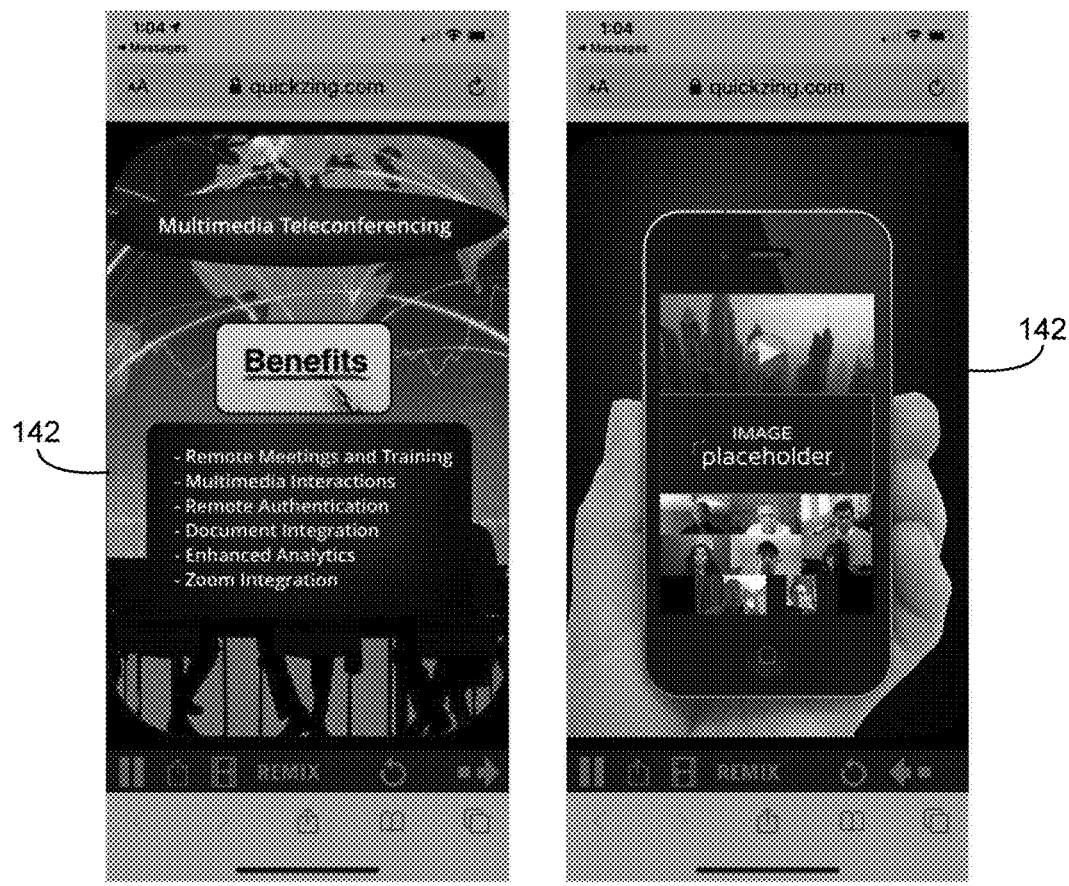
FIG. 3 is a screen view of a smartphone with an exemplary multimedia conferencing home page.
FIG. 4 is a screen view of a smartphone with an exemplary tiled multimedia streaming to the smartphone.
Figure 5:
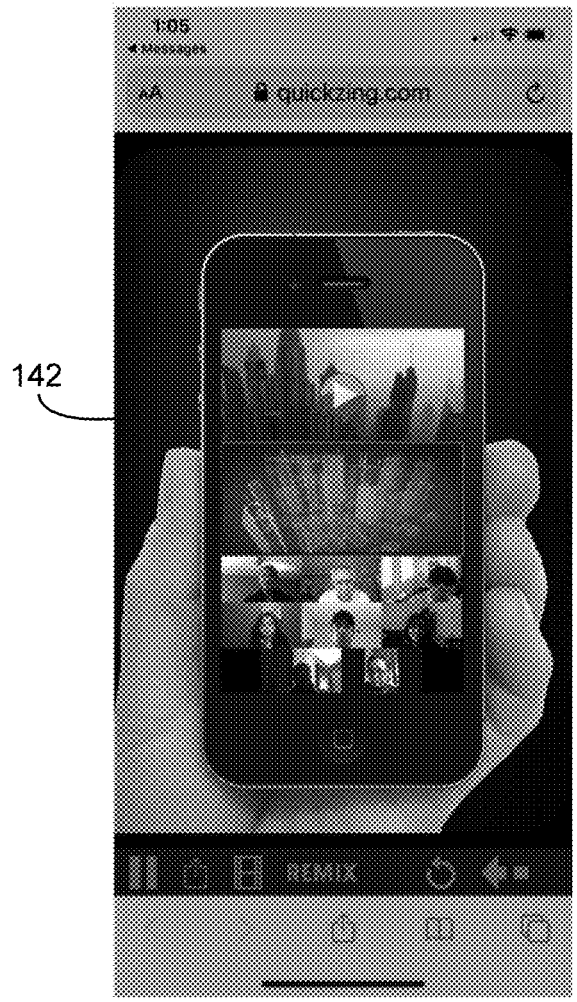
FIG. 5 is a screen view of a smartphone with an exemplary tri-tiled multimedia streaming to the smartphone.
Figure 6:
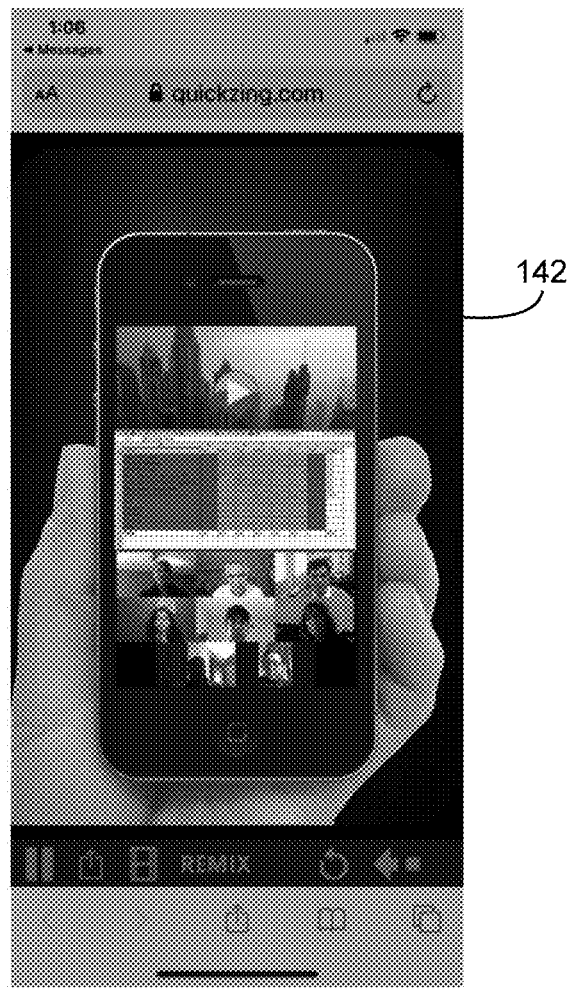
FIG. 6 is a screen view of a smartphone with an exemplary tri-tiled multimedia streaming to the smartphone with a video on the top tile, a document presentation a middle tile, and a multi-person video conference call on the bottom tile.

FIGS. 1 and 2 show a preferred embodiment of a system or platform 100 having a processor 102, a database server 104 that stores data pertaining to registered users, and a compiler 106 that builds a template 108 with a plurality of tiles 110, each tile matching a media type allowing a user monitor to display multiple forms of media concurrently. System 100 preferably includes an artificial intelligence (AI) agent 112 to analyze a participant/user's habits and portray the media in a manner for conducive to the viewing style of the user. The preferred elements of platform 100 and their interrelationship are described below.

Referring to FIG. 1, processor 102 preferably functions as a "host" in the overall system. Processor 102 controls which users/participants/guests have access to specific services and roles. Participants can be promoted to have host access to upload or display media depending on the situation. Processor 102 is configured to send instructions to a user/client station to display media content and information according to its original media format of creation.

Database server 104 is a user database containing contact details of users permitted access to platform 100. Database server 104 preferably includes authentication services to control access and maintain appropriate user roles.

Compiler 106, shown as a "Telezing Server" in FIG. 1, is configured to present a multimedia template 108 at a user/client workstation. Template 108 includes a plurality of tiles 110, each tile 110 corresponding to a different media type. Compiler 106 is configured to identify a media type of an incoming media stream or media presentation, and route the incoming media to a tile 110 having a matching media type so that the media stream or presentation displays in the tile corresponding to its media type. Template 108 may be configured to present tiles corresponding to at least two or more of the following media types and/or services 114 listed in FIG. 1: incoming one-way video or two-way video conferencing streaming video service 116; still media or image service 118 (e.g., JPEG, DOC, PDF, etc.); audio service 120 (preferably portrayed with a static visual image); a shopping cart transaction service function 122; an identification service 124, such as with a biometric technology like facial recognition, fingerprint scan, and so on; an interactive document service 126 (e.g., surveys, exams, e-sign documents, contracts, etc.); and a tile for other services 128 such as websites, WordPress, search engines, and access to other databases.

Continuing with reference to FIG. 1, platform 100 preferably includes AI agent 112 to analyze a participant/user's habits, and portray the media in a manner for conducive to the viewing style of the user. If desired, media from compiler 106 may be routed through AI agent 112 before assembly at template 108 to enhance the portrayal of the media at the client display. For some services, peer-to-peer messaging may be used instead.

Video conferencing services involves a more complex form of communication. Preferably, a designated video conferencing servicer 130 is specially configured to handle video data from a user camera to a display to another user's monitor, often across many participants concurrently.

FIG. 2 shows an exemplary display that is templated into four tiles 110. A video conferencing tile 132 is configured for display and functionality of interactive video conferencing. Conferencing tile 132 includes a plurality of participant windows 134 corresponding to the video feed originating from a participant camera at the participant/client end. A still image tile 136 is configured to display still images concurrently with functionality of the video conference call. An incoming, one-way video tile 138 is configured to display a video separately from the video conference call. A fourth tile, a document tile 140, is configured to display documents such a portion from a Word document, a PDF, or a power point display. As shown in FIG. 2, the enumerated formats above are compiled at the user/participant display, and portrayed concurrently. Video conference participants see the same media tiles being seen by each participant, except where one or more forms of media portrayal has been individually slightly altered through interaction with AI agent 112 (described further below).

The arrangement of tiles/windows/placeholders may fluidly change based upon the device and aspect in which it is held or viewed. In general, mobile phones will stack windows vertically and when the phone is held horizontally the top media window shall format to full screen with the other windows easily accessed by scrolling down. The tiles or windows can easily be rearranged in whatever order or layout the viewer wishes (click and drag). Each window may have its own scroll down, zoom, or slide component depending upon the nature of the content it is displaying. On laptops and computers, the default format will preferably have four windows arranged initially in a quadrant layout, such as shown in FIG. 2.

It will be appreciated that presentation on a computer monitor is not essential. Multimedia presentation on handheld devices, such as tablets and smartphones, is also possible. FIGS. 3-6 show video conferencing in combination with a still media and one-way video presentation on a smartphone 142.

Compiler 106 may be configured to act as a multi-level security gateway that is configured for multiple media types. As a security gateway, compiler 106 may be configured to accommodate one or more of a document verification security protocol, a document signature (e-signature) verification security protocol, and biometric verification security protocol, which may include the use of facial recognition technology. Other security protocols are possible, as would be appreciated by one of ordinary skill in the art.

The applicability of platform 100 is adaptable and beneficial across a wide range of uses. For example only, platform 100 may be specifically tailored to an academic online learning environment. Template 108 may include a first tile for live video conferencing with multiple participants (e.g., students), a second tile for a document presentation, such as a Word, PDF or other still image, and a third tile for a power point presentation. Compiler 106 may utilize a multi-level security gateway function for student identification verification, document submission, and student testing soundness (verifying that student exam responses are delivered to the learning institution without input by third parties other than the student providing the answers).

In an academic setting, the platform may be configured for one to one screen sharing between teachers and each individual student for the purposes of test taking and monitoring. A teacher's dashboard would allow the teachers to view and monitor each student's computer screen during the test as they saw fit along with artificial intelligence in the background (described below) that could pick up unusual activity, red flags, learning patterns, shortcomings, glitches, etc. This would be complimented by the video component in video conferencing, for example, as another visual monitoring system in conjunction with the student's screen.

The platform may include a teaching bot teacher and tutors spearheading a multimodal learning platform that is interactive in real time. These teaching counselors/bots would effectively be on call 24/7 and tap into the multimodal strengths and weaknesses of each student across a personalized learning platform. The infusion of artificial intelligence with multimodal (voice, imagery, video) delivery would create a compelling personality to drive engagement beyond typical levels. The scalability of bot tutors mixed with pre-existing famous personality characteristics that are personalized on a "one-to-one" basis would solve the Bloom 2 Sigma Problem resulting in a factor even greater than two for educational outcomes.

In another context, platform 100 may be specifically tailored to the legal environment where template 108 includes a first tile for live video conferencing with multiple participants (e.g., opposing lawyers, a judge, and one or more witness, and even groups of individuals such as a jury), a second tile for a document presentation (simulating a whiteboard format, or displaying still images such as photographs of a scene), and a third tile for an incoming one-way video stream, such as a setting of a courtroom, or video of a crime scene, etc.

An academic or legal context are but two examples of the wide applicability of platform 100 for different situations in today's world. It will be appreciated that a template may be configured for other contexts as well.

Where platform 100 includes an AI agent, such as AI agent 112 in FIG. 1, the AI agent is preferably configured with a classifier, such as a neural network, in combination with one or more other forms of classifiers and statistical applications, such as a Bayesian classifier, and other types of classifiers which would be apparent to a person of ordinary skill in the art, and for simplicity, are not detailed herein. The use of AI agent 112 depends on the context that platform 100 is being used. For example, in an online academic context, AI agent 112 may be configured to compare the demographics of the user student with the user's prior interactions with learning material in the academic setting, and determine if the user is a visual, auditory, and/or abstract leaner; or a kinesthetic learner based on the output of the classifier. The primary classifier in the above-described example is preferably an artificial neural network.

In other settings, and in general, a video conferencing business setting, AI agent 112 may be configured to compare the demographics of a user at their workstation, the geographical location of the workstation, and the subject matter of the incoming communications to determine a portrayal of an incoming media to the user based on the output of the classifier. In this situation, a neural network is also a preferred primary classifier.

Having described the preferred components of platform 100, a preferred method of use will now be described for displaying multiple live media streams from a single communication. First, incoming media streams are split according to media type. Next, the media type of an incoming stream is matched with a media type of a predesignated tile of a screen template being displayed on a user's monitor. Then the matched media is displayed in the correct tile on the user's monitor. At least a first of the incoming streams preferably relates to an interactive video conference call. At least a second of the incoming streams relates to a presentation of documents. At least a third of the incoming streams relates to a presentation, such as a power point presentation. It will be appreciated that other media types are applicable, and may be added or substituted as appropriate. For example, a fourth media stream relating to a one-way video of an indoor setting may be split and matched in similar fashion as outlined above.

Where desired, the method may include the use of artificial intelligence agent 112 to compare the demographics of the user with the user's prior interactions with learning material in an indoor setting, such as a classroom, webinar, or corporate training session, and determine if the user is a visual, auditory, and/or abstract leaner; or a kinesthetic learner based on the output of the classifier. Alternatively, the method may include using artificial intelligence agent 112 to compare the demographics of the user with the user's prior interactions with incoming streaming material, and determine at least one of content suggestions, content improvements, content enhancements, and content edits based on the output of the classifier.

It will be appreciated that the steps described above may be performed in a different order, varied, or some steps omitted entirely without departing from the scope of the present disclosure.

The foregoing description is by way of example only, and may be varied considerably without departing from the scope of the present invention. For example only, a multitude of tiles or windows may be included to specifically accommodate other formats, such as augmented reality, "Quickzing" (the inventor's own format described PCT Publication No. WO 2015/151037, the entire disclosure of which is hereby incorporated by reference herein), and any other type of media with a livestream/or site which can be viewed via URL, etc. Additional formats may include Learning Management Systems (LMS), gaming, Twitter/news feeds and/or sports (e.g., a live football game could be streamed in one window while a variety of people in a video conference call view it together along with another gaming window which articulates gaming details of their fantasy football league). The platform may also be configured for use in the medial field as desired.

The platform in a preferred form provides the advantages of reduced travel costs, multi-modal learning, remote verification of training modules and certification testing. Media content such as images, video, and documents and PDF files, etc., are of much higher quality and resolution in the above-described system compared to a conventional video conference call environment which relies on a screen share feature with lower resolution.

The platform in a preferred form also allows for heightened interactivity of each type of media or document (e.g., a teacher handing out/initiating a test or a pop quiz along with corresponding analytics, authentication, and monitoring). This interactivity across media, documents, shopping carts, eSignatures, etc., with multimodal (visual, audio, biometric) confirmations in real time will naturally accelerate the effectiveness, efficiency, and richness of communication across virtually every business vertical, learning applications, and social interaction. From a security standpoint, combining a multiplicity of communication and content windows with other windows comprised of phone calls or messaging services creates multiple layers of content firewalls versus one used in isolation.

Using QR codes (and the like) can also act as an excellent gateway to a multiplicity of interactions through this multimedia platform. Traditionally codes link to a singular URL which forces a one size fits all approach to interactions which reduces engagement and conversions. Also, the current approach to communication across media typically involves a fragmented series of linear interactions and pages that require a number of decisions in sequence to complete a transaction. Spreading out numerous decisions across several pages/interactions further diminishes outcomes and conversions. However, creating a wider multimodal approach concurrently in one place, lends itself to 'simultaneous decision making.' A sample embodiment could involve a QR code on a real estate sign whereby upon scanning the code a prospect is presented with 3-4 tiles stacked vertically on their phone. One window could be a call or messaging tile with further windows covering a wide range of interactions and content such as: 3D imagery of the house, documentation, company/house videos, e-signatures, surveys, all the way to blockchain and ID authentication biometrics for financing/purchasing. Every element of a transaction from initial awareness/marketing touch point to closing on the sale of a house can be completed in one platform in the palm of your hand.

Another embodiment could involve gathering information as part of a multimodal research platform. A number of large 'survey' companies dominate the R&D market with millions of other ones filling out the landscape. Remote R&D and focus groups could be implemented through the platform via a variety of windows in conjunction with each other such as—A remote moderator/or textual instructions, a video commercial being tested, a survey to be completed after viewing the video etc.

A further embodiment would involve virtually every touch point across the recruitment and employee journey. A sample layout for gathering the initial job application in the multimedia format could involve the following four windows—A. upload your resume and cover letter. B. Record a video of yourself answering questions viewed in another window. C. Information about the company. D. A questionnaire, sample work document or e-signature. Subsequent touchpoints such as an interview would then take on another mix of windows that would include a video conferencing tile along with other options such as testing, or interactive whiteboards and biometrics. Further interactions with employees could also take on a multimodal format for example when conducting reviews of personnel. All this plethora of interactions across the various types of multimedia during an employee's journey will create a rich archive of data for the entire spectrum from initial application and interview, through to retirement.

Another embodiment would be to retrofit medical equipment via a QR code and or 'Multimedia Telemedicine'. A sample use case in this scenario could involve an imagery window for x-rays and the like along with a video conferencing window between the doctor/nurse and patient, along with an EHR (electronic healthcare record) window, along with a tutorial or explanatory video, prescription document, e-signature, and any number of other complimentary tiles that expedite, verify, and simplify interactions between patients and healthcare staff. A remote patient could be instructed to walk in front of their webcam so that the doctor could implement video AI for use in determining if they needed a hip replacement surgery, or to diagnose Parkinson's disease by their gait. Such guidance would work much more effectively with both parties accessing concurrent windows in their communication.

A further embodiment could involve e-commerce. While video has effectively taken over the internet and become an important tool in marketing, there is no simple unified way to quickly close a transaction after a video marketing campaign puts out a call to action. With this platform however, any video commercials or calls to action can have an adjoining tutorial video, company information, 3D product imagery, shipping details, biometric authentication, and payment windows all together concurrently so that consumers have every element necessary to complete a transaction. This would increase revenue and reduce shopping cart abandonment rates (currently around 76%) by creating simultaneous decision making and removing distractions from the customer journey. Television, streaming video and online campaigns could also include QR codes on their broadcasts linking to this concurrent layout of a variety of URLs and interactions.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A multi-media video conferencing platform, comprising:
    a user database configured to store usernames and details;
    a processor configured route multiple media streams to a user location; and
    a compiler configured to present a multimedia template at a client workstation, the template having a plurality of tiles, each tile corresponding to a different media type, said compiler being configured to identify a media type of an incoming media stream or media presentation, and route the incoming media to a tile having a matching media type so that the media stream or presentation displays in the tile corresponding to its media type, the template presented by said compiler having tiles corresponding to at least incoming streaming video, incoming still media, and two-way interactive video.

2. The conferencing platform of claim 1, wherein one of the tiles is configured for an augmented reality media.

3. The conferencing platform of claim 1, wherein one of the tiles is configured for music streaming media.

4. The conferencing platform of claim 1, wherein one of the tiles is configured for a shopping cart transaction gateway.

5. The conferencing platform of any one of the above claims, wherein said compiler is configured to act as a multi-level security gateway configured for concurrent multiple media types.

6. The conferencing platform of claim 5, wherein the security gateway is configured to accommodate a document verification security protocol.

7. The conferencing platform of claim 5, wherein the security gateway is configured to accommodate a document signature verification security protocol.

8. The conferencing platform of claim 5, wherein the security gateway is configured to accommodate a biometric verification security protocol.

9. The conferencing platform of claim 5, wherein the security gateway is configured to accommodate an identity verification security protocol that uses facial recognition technology.

10. The conferencing platform of claim 1, wherein said template is configured for use in a legal environment, said template including a first tile for live video conferencing with multiple participants, a second tile for document presentation, and a third tile for an incoming one-way video stream.

11. The conferencing platform of claim 1, wherein said template is configured for use in an online learning or training environment, said template including a first tile for live video conferencing with multiple participants, a second tile for document presentation, and a third tile for power point presentation.

12. The conferencing platform of claim 11, wherein said compiler is configured as a multi-level security gateway for student identification verification, document submission, and student testing soundness.

13. The conferencing platform of claim 1, wherein said compiler includes an artificial intelligence module with at least one classifier, said artificial intelligence module being configured to compare the demographics of a user at the workstation, the geographical location of the workstation, and the subject matter of the incoming communications to determine a portrayal of an incoming media to the user based on the output of the classifier.

14. The conferencing platform of claim 1, wherein said compiler includes an artificial intelligence module with at least one classifier, said artificial intelligence module being configured to compare the demographics of the user with the user's prior interactions with learning material in an academic setting, and determine if the user is a visual, auditory, and/or abstract learner, or a kinesthetic learner based on the output of the classifier.

15. The conferencing platform of claim 13, wherein the classifier is an artificial neural network.

* * * * *